United States Patent [19]

Miller et al.

[11] 4,154,792
[45] May 15, 1979

[54] DISTRIBUTION SYSTEM FOR BLOOD TREATMENT APPARATUS

[75] Inventors: Jimmy L. Miller, Waukegan; William J. Schnell, Wheeling, both of Ill.

[73] Assignee: Baxter Travenol Laboratories, Inc., Deerfield, Ill.

[21] Appl. No.: 883,457

[22] Filed: Mar. 6, 1978

Related U.S. Application Data

[63] Continuation-in-part of Ser. No. 732,232, Oct. 14, 1976, abandoned.

[51] Int. Cl.² ............................................. A61M 1/03
[52] U.S. Cl. ............................ 422/48; 128/DIG. 3; 210/321 B
[58] Field of Search ............. 23/258.5 M, 258.5 MH; 210/321 B, 321; 128/DIG. 3

[56] References Cited

U.S. PATENT DOCUMENTS

| | | | |
|---|---|---|---|
| 3,034,505 | 5/1962 | Sobol | 23/258.5 M |
| 3,362,540 | 1/1968 | Bluemle | 23/258.5 M X |
| 3,459,310 | 8/1969 | Edwards | 23/258.5 M X |
| 3,501,011 | 3/1970 | Alwall et al. | 210/321 B |
| 3,540,595 | 11/1970 | Edwards | 23/258.5 M X |
| 3,541,595 | 11/1970 | Edwards | 23/258.5 M X |
| 3,547,271 | 12/1970 | Edwards | 23/258.5 M X |
| 3,594,130 | 7/1971 | North | 23/258.5 M |
| 3,837,496 | 9/1974 | Hugstrom et al. | 210/321 B |
| 3,932,283 | 1/1976 | Esmond | 23/258.5 M X |
| 4,016,081 | 4/1977 | Martinez et al. | 210/321 B |

FOREIGN PATENT DOCUMENTS

| | | | |
|---|---|---|---|
| 1239211 | 7/1971 | United Kingdom | 210/321 |
| 1437633 | 6/1976 | United Kingdom | 23/258.5 M |

*Primary Examiner*—Barry S. Richman
*Attorney, Agent, or Firm*—Paul C. Flattery; George H. Gerstman

[57] ABSTRACT

A stacked membrane apparatus for dialyzing or oxygenating blood, in which the blood compartment is isolated from the fluid (e.g., dialysate or oxygen) compartment without compressive forces being imposed by the casing to the blood manifold regions of the unit. Spaced means are provided for closing membranes about membrane support plates in such a fashion as to provide blood flow paths in the space between the closing means.

11 Claims, 10 Drawing Figures

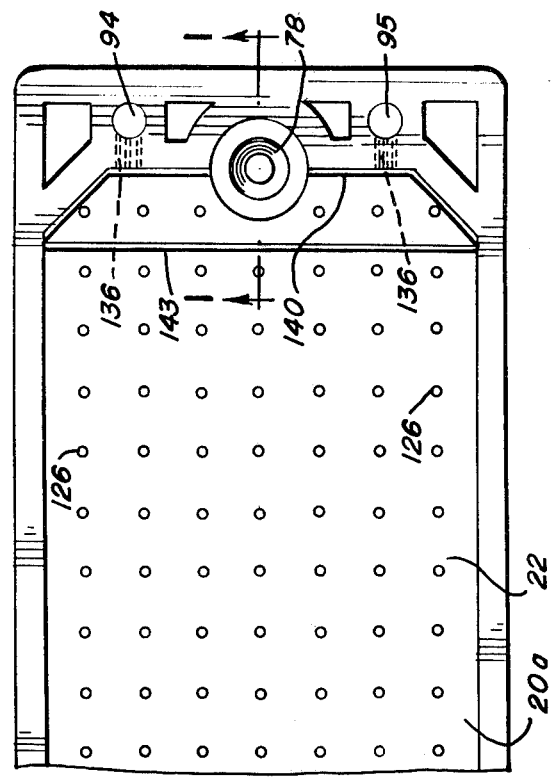
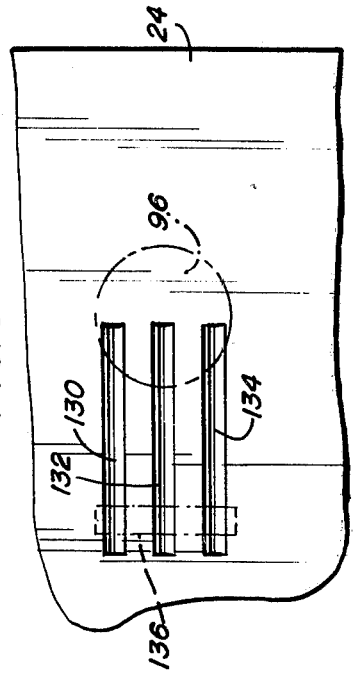
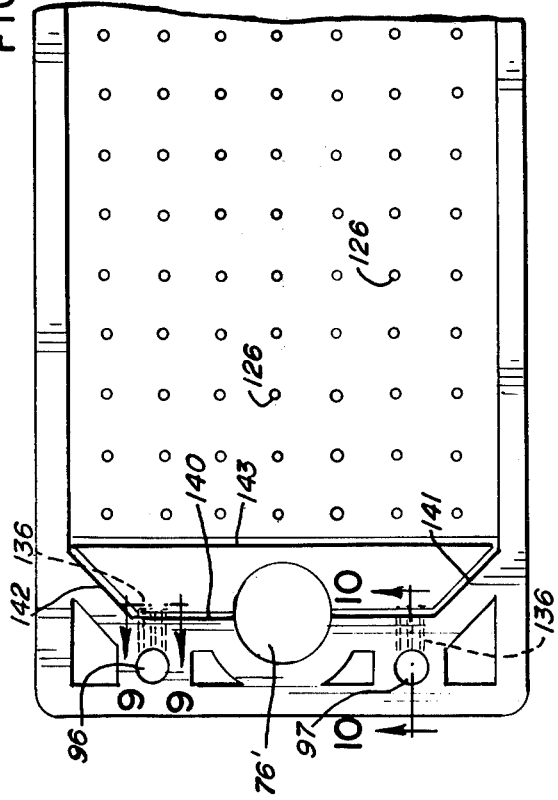
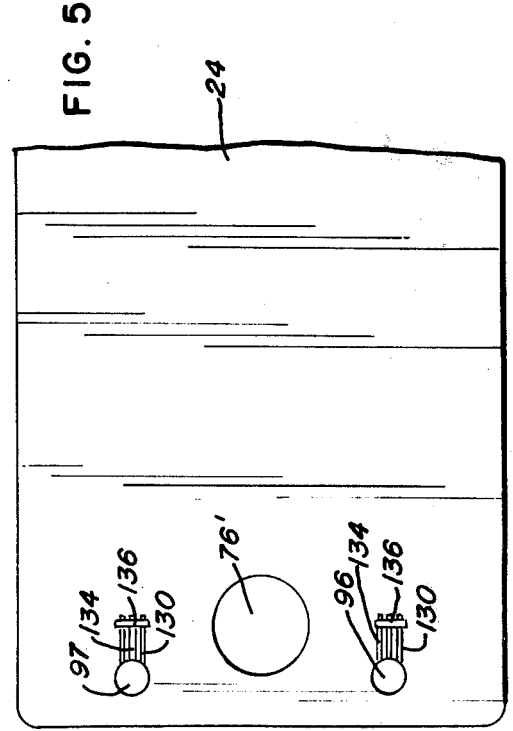

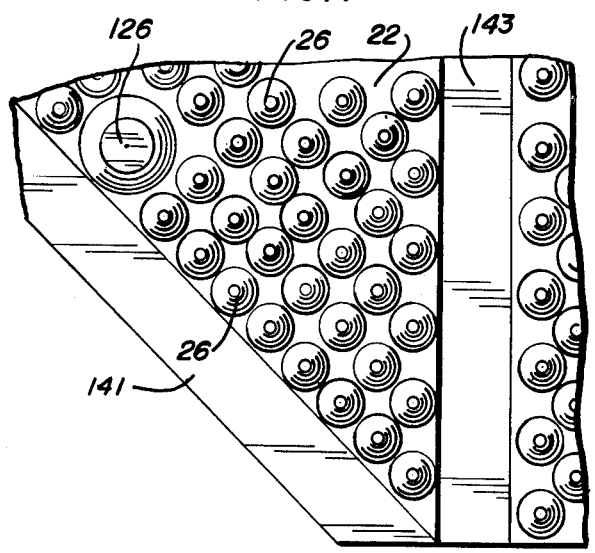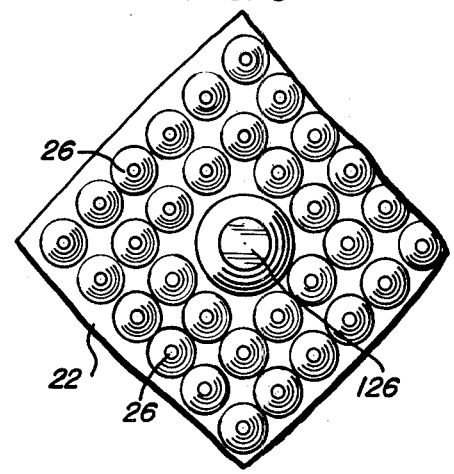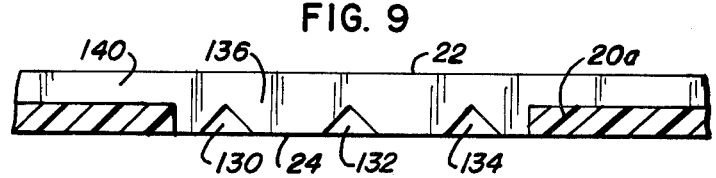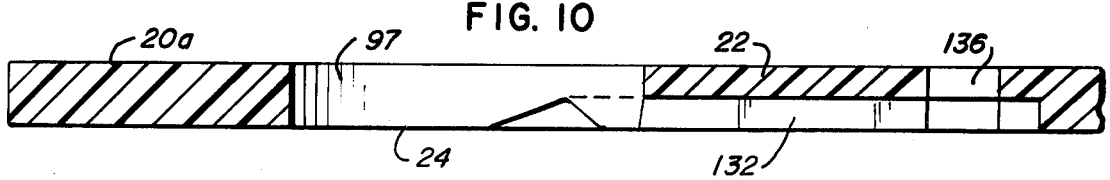

DISTRIBUTION SYSTEM FOR BLOOD TREATMENT APPARATUS

BACKGROUND OF THE INVENTION

This application is a continuation-in-part of application Ser. No. 732,232 filed Oct. 14, 1976 and now abandoned.

The present invention relates to fluid treatment apparatus, and more particularly, apparatus for dialyzing or oxygenating blood utilizing the transfer of fluid through a membrane.

A prior art type of membrane-fluid transfer device includes (a) a plurality of fluid distribution plates with a pair of membranes interposed between each pair of plates, and (b) blood distribution buttons compressed between each plate for permitting the flow of blood through radial distribution channels defined by the buttons and between membranes while dialysate or oxygen flow is provided in the volume between the plate and the opposite side of the membrane. This type of dialyzer or oxygenator requires relatively thick plates and also requires that the casing supply compressive forces to close the stack of membranes and plates. Further, the necessity of having a plurality of blood buttons with distribution channels is detrimental to compactness of the system and forces the blood to flow through a tortuous path within the blood button which is detrimental to the optimization of a system in which the blood has smooth, laminar flow.

It is therefore, an object of the invention to provide a distribution system for fluid treatment apparatus in which the apparatus size can be kept relatively small.

Another object of the present invention is to provide a dialyzer or oxygenator in which the casing (i.e., housing) of the unit does not have to supply compressive forces to the blood manifolds, thereby permitting the casing to be relatively small and light.

A further object of the present invention is to obviate the use of blood buttons having internal radial distribution channels.

A still further object of the present invention is to provide a dialyzer or oxygenator in which the blood can flow smoothly without being forced through a tortuous path within a blood manifold.

In Meyers, et al. U.S. Pat. No. 3,464,562 and Critchell, et al. U.S. Pat. No. 3,501,010, dialyzing apparatus is disclosed in which blood manifolding occurs on a side of the membrane support plates and the blood manifold system does not extend through the membranes and membrane support plates. In order to accomplish the construction disclosed in Meyers, et al. and Critchell, et al., however, the membranes have to be centered precisely within the frame during construction. For example, FIGS. 5-6 of Critchell, et al. and column 3, line 59 to column 4, line 14 of Critchell, et al. are illustrative of the precision required in constructing the apparatus.

It is, therefore, another object of the present invention to provide a dialyzer or oxygenator which is simple in construction, economical to manufacture, lends itself to automation and alleviates the precision necessary in constructing the type of apparatus disclosed in Meyers, et al. and Critchell, et al.

A further object of the present invention is to provide a dialyzer or oxygenator which uses relatively inexpensive membrane support plates, such as membrane support plates which are manufactured using embossing and stamping techniques.

In Dutch patent specification No. 7504359 in the name of Gambro AG, filed Apr. 11, 1975, and disclosed Oct. 20, 1975, a dialysis system is suggested in which membranes between membrane support plates are heat sealed to each other at the dialysate manifold port. By sealing the dialysate distribution manifold, however, the transmembrane pressure differential tends to place the seal in peel. We have discovered a means for overcoming this disadvantage, and in the present invention the membranes on opposite sides of a membrane support plate are sealed to each other at the blood manifold port, whereby the transmembrane pressure differential does not place stress on the seal and, in fact, the transmembrane pressure differential is favorable to maintaining the seal.

Other objects and advantages of the present invention will become apparent as the description proceeds.

SUMMARY OF THE INVENTION

In accordance with the present invention, there is provided apparatus for the treatment of fluid by means of a membrane. The improvement comprises first and second membrane support plates, each having means on opposite sides thereof for supporting a membrane and forming open volumes therebetween. First and second membranes are supported on opposite sides of the first membrane support plate and third and fourth membranes are supported on opposite sides of the second membrane support plate. The second membrane faces the third membrane to form a blood path between the second and third membranes. The volumes between each membrane support plate and each membrane comprises a fluid flow path.

In the illustrative embodiment, a blood manifolding path extends through the membranes and the membrane support plates. First means are provided for closing the first and second membranes adjacent the blood manifolding path and second means are provided for closing the third and fourth membranes adjacent the blood manifolding path. The first and second closing means each operate to segregate the blood flow path and the fluid flow path. The first and second closing means are spaced from each other to define a blood flow path therebetween and are independent of each other whereby the closing forces generated by the first closing means on the first and second membranes are independent of the closing forces generated by the second closing means on the third and fourth membranes.

In one embodiment, the first closing means and the second closing means each comprise a sealed grommet defining an axial bore extending through the grommet and forming a portion of the blood manifolding path.

A more detailed explanation of the invention is provided in the following description and claims, and is illustrated in the accompanying drawings.

BRIEF DESCRIPTION OF THE DRAWINGS

FIG. 4 is a top plan view of one-half of a membrane support plate;

FIG. 5 is a fragmentary bottom plan view of the membrane support plate half of FIG. 4;

FIG. 6 is a fragmentary enlarged view of the fluid distribution channels of the membrane support plate;

FIG. 7 is a fragmentary enlarged view of a portion of the membrane support plate of FIG. 4;

FIG. 8 is a fragmentary enlarged view of a portion of the membrane support plate of FIG. 4;

FIG. 9 is an enlarged cross-sectional view taken along the plane of the line 9—9 of FIG. 4; and FIG. 10 is a fragmentary enlarged cross-sectional view taken along the plane of the line 10—10 of FIG. 4.

DETAILED DESCRIPTION OF THE ILLUSTRATIVE EMBODIMENT

Figure 1:
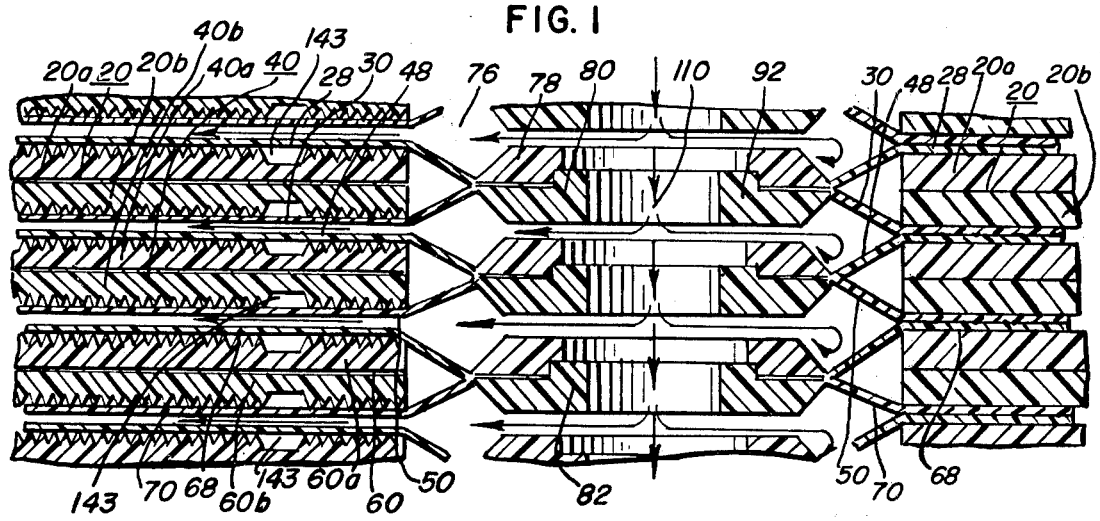
FIG. 1 is a fragmentary, enlarged cross-sectional view of a distribution system constructed in accordance with the principles of the present invention, similar to as if taken along the plane of the line 1—1 of FIG. 4.
Figure 2:
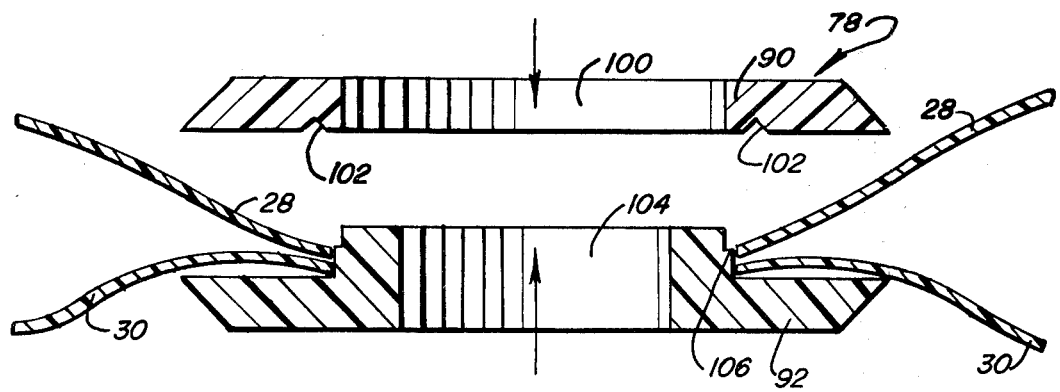
FIG. 2 is an enlarged cross-sectional view of a grommet of the type which can be used in the distribution system of FIG. 1.
Figure 3:
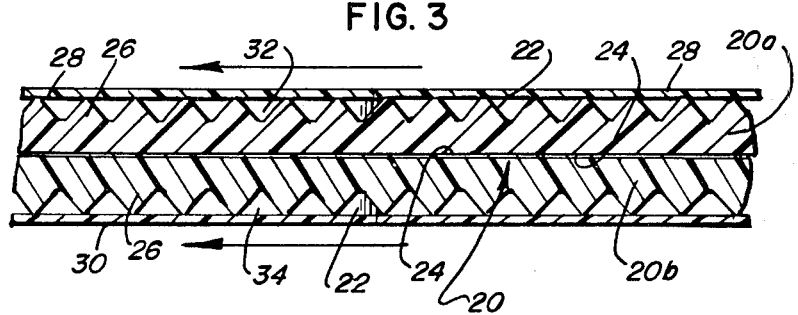
FIG. 3 is a fragmentary, cross-sectional view of a membrane support plate with a pair of membranes being supported thereby.

Referring to FIGS. 1-3, there is shown a distribution system for fluid treatment apparatus comprising a plurality of membrane support plates, each of which membrane support plates supports a membrane on an opposite side thereof. As shown most clearly in FIG. 1, a first membrane support plate 20 is formed of two identical halves 20a and 20b. Referring to FIG. 4, it is seen that membrane support plate half 20a has a membrane support surface 22 and FIG. 5 shows the underside thereof, which is a planar surface 24. Membrane support plate half 20b, which is identical to membrane support plate half 20a, has its corresponding planar underside abutting the planar underside 24 of membrane support plate half 20a to form first membrane support plate 20.

Since all of the membrane support plates are identical in construction, only membrane support plate 20 need be discussed in detail. It can be seen that membrane support plate 20 has oppositely positioned membrane support surfaces 22 which carry a plurality of cones 26 upon which membranes 28 and 30 are supported. Further, an open volume 32 is provided between the membrane support plate 20 and membrane 28 and an open volume 34 is provided between the membrane support plate 20 and membrane 30, as shown most clearly in FIG. 3. It is to be understood that while a conical membrane support plate surface is illustrated herein, many other configurations may be used in obtaining proper fluid distribution.

Referring to FIG. 1, a second membrane support plate 40 is shown, comprising top half 40a and bottom half 40b, identically in the manner that membrane support plate 20 comprises top half 20a and bottom half 20b. Second membrane support plate 40 supports third membrane 48 and fourth membrane 50. Second membrane support plate 40 and membranes 48 and 50 supported thereby are identical to first membrane support plate 20 and membranes 28 and 30 supported thereby.

Likewise, a third membrane support plate 60 comprising top half 60a and bottom half 60b is provided for supporting membranes 68 and 70. Likewise, third membrane support plate 60 and membranes 68 and 70 supported thereby are identical to membrane support plates 20 and 40 and membranes 28, 30 and 48, 50, respectively, supported thereby.

It is to be understood that while, first, second and third membrane support plates 20, 40 and 60, respectively, are shown, the dialyzer or oxygenator may contain a much larger number of membrane support plates which support membranes and are constructed identically to membrane support plate 20. The membrane may be formed of conventional semipermeable membrane, such as Cuprophan® material, all as is well-known in the art.

The membrane support plates define openings 76 which are aligned and into which are positioned grommets for closing the membranes supported by each membrane support plate. As illustrated in FIG. 1, a grommet 78 is associated with membrane support plate 20 for closing first and second membranes 28, 30, respectively. Likewise, a grommet 80 is positioned in opening 76 adjacent second membrane support plate 40 for closing third and fourth membranes 48 and 50. A third grommet 82 is positioned in opening 76 adjacent third membrane support plate 60 for closing membranes 68 and 70. Additional grommets are positioned in the openings 76 of each other membrane support plate for closing the membranes supported by each membrane support plate.

Since each of the grommets is identical, the construction of grommet 78 will be explained in detail, referring to FIG. 2. Grommet 78 comprises an upper ring 90 and a lower ring 92 which are ultrasonically welded to each other to close membranes 28 and 30. Each of the membranes is pre-punched so that when it overlies the membrane support plate (see FIG. 4) openings in the membrane will align with blood openings 76 and 76' and dialysate or oxygen openings 94, 95, 96 and 97.

Upper ring 90 defines a central opening 100 and is provided with a weld trap 102 annularly about the underside of ring 90. Lower ring 92 defines a central opening 104 and includes a shear joint 106 which operates during sonic welding in accordance with principles well known in the ultrasonic welding art. As a specific example, grommet 78 may be formed of Lexan® plastic.

Top ring portion 90 and bottom ring portion 92 are sonically welded together to fuse and form a closing means for closing the membranes supported by the membrane support plates. The central openings defined by the grommets form a blood manifolding path 110 which permits the blood to flow freely through this path and through the blood paths between adjacent membranes and indicated by the arrows illustrated in FIG. 1.

It can be seen that each of the grommets 78, 80, 82, etc., close the membranes supported by an adjacent membrane support plate and each grommet is spaced from the other to define a blood flow path therebetween. Further, each grommet is independent of the other whereby the closing forces on each pair of membranes supported by a membrane support plate are independent of the closing forces on the other pair of membranes supported by other membrane support plates.

Although a grommet closure system is shown herein, it is to be understood that other closure systems may be used. For example, the membranes 28, 30 may be heat sealed or may be cement bonded instead of being closed by means of a grommet. It is preferred that each of the membrane pairs be closed in the same manner as the closure for the other membrane pairs.

In order to aid in understanding the fluid flow (e.g., the dialysate or oxygen flow) reference is made to FIGS. 4-11. Membrane support surface 22 includes a large number of cones 26 (illustrated in FIGS. 7 and 8) with larger size cones 126 interspersed throughout the surface area.

Each membrane support plate half 20a (or 20b, or 40a or 40b, etc.) has dialysate (or oxygen) openings 94, 95, 96 and 97. The dialysate (or oxygen) flow through openings 94-97 is as follows. The fluid flows through the openings and via channels 130, 132 and 134 (which are defined by underside 24) to openings 136 which extend through plate 20a. Openings 136 communicate with fluid manifold groove 140 which aid in the distribution of fluid through the volume defined by the cones 26, 126 and the membranes supported thereby. Angular distribution channels 141 and 142 communicate with channel 140 and transverse distribution channel 143 further aids in the proper distribution of fluid.

It can be seen that the fluid (e.g., dialysate or oxygen) path is effectively encapsulated with the blood compartment isolated from the fluid compartment in the blood manifold region, without compressive means being imposed on the blood manifolding region. Since the casing does not have to supply compressive forces to the blood manifolding region, the casing can be smaller and lighter, the means for closing the membrane pairs can be small and the dialyzer or oxygenator can be relatively thin. Further, the blood path is not a tortuous path through distribution channels of a blood button, but is instead a smooth path, as most clearly shown in FIG. 1.

Although there are many types of devices that could be used to stack the parallel membrane support plates 20, 40 60, etc. and support the membranes 28, 30, 48, 50, 68, 70, etc., an example of a suitable device is disclosed in copending U.S. application Ser. No. 732,233 filed Oct. 14, 1976 in the name of William J. Schnell for "Dialyzer Casing."

Although an illustrative embodiment of the invention has been shown and described, it is understood that various modifications and substitutions may be made by those skilled in the art without departing from the novel spirit and scope of the present invention.

What is claimed is:

1. In an apparatus for the treatment of blood by means of a membrane, a stack of parallel membranes and membrane support plates with each membrane support plate having a membrane positioned on opposite sides thereof; the improvement comprising, in combination: a blood manifolding path extending through said stack; closing means sealing the membranes on opposite sides of each membrane support plate to each other adjacent said blood manifolding path, said closing means being spaced from each other to define a blood path therebetween and being independent of each other whereby the closing forces generated by one of the closing means on its respective membranes are independent of the closing forces generated by other closing means on their respective membranes.

2. Apparatus as described in claim 1, wherein said closing means each comprise a sealed grommet defining an axial bore extending through the grommet and forming a portion of the blood manifolding path.

3. Apparatus as described in claim 1, wherein said closing means comprise heat sealed membrane portions defining a portion of said blood manifolding path.

4. Apparatus as described in claim 2, wherein said closing means comprise adhesive bonded membrane portions defining a portion of said blood manifolding path.

5. In an apparatus for effecting the treatment of blood by means of a stack of parallelly disposed membranes including means for isolating the respective blood and treatment fluid compartments from each other in the blood manifold region; the improvement comprising said isolating means comprising means for closing a first and second membrane about a first membrane support plate, means for closing a third and fourth membrane about a second membrane support plate, said second and third membranes facing each other to define a blood flow path therebetween, fluid distribution volumes defined between each membrane and its associated membrane support plate, said closing means being spaced from each other to define a blood flow path between said second and third membranes, said closing means defining a blood manifolding path extending through said membranes and membrane support plates and not requiring radial distribution channels through said closing means, said blood manifolding path permitting the blood to flow in the blood flow path defined by the spacings between said closing means for blood flow between the membranes facing each other.

6. Apparatus as described in claim 5, wherein said membrane support plates are parallelly positioned and said blood manifolding path comprises a path normal to the longitudinal axis of said membrane support plates.

7. In an apparatus for the treatment of blood by means of a membrane, a first membrane support plate and a second membrane support plate, said first and second membrane support plates each having means on opposite sides thereof for supporting a membrane and forming open volumes therebetween; first and second membranes supported on opposite sides of said first membrane support plate; third and fourth membranes supported on opposite sides of said second membrane support plate; said second membrane facing said third membrane to form a blood path between said second and third membranes; said volumes between each membrane support plate and each membrane comprising a fluid flow path; the improvement comprising, in combination: a blood manifolding path extending through said membranes and said membrane support plates; first means closing said first and second membranes adjacent said blood manifolding path; second means closing said third and fourth membranes adjacent said blood manifolding path; said first and second closing means each operating to segregate the blood path and said fluid flow path, said first and second closing means being spaced from each other to define a blood path therebetween and being independent of each other whereby the closing forces generated by said first closing means on said first and second membranes are independent of the closing forces generated by said second closing means on the third and fourth membranes.

8. Apparatus as described in claim 7, wherein said first closing means and said second closing means comprise heat sealed membrane portions.

9. Apparatus as described in claim 7, wherein said first and second closing means comprise adhesive bonded membrane portions.

10. Apparatus as described in claim 7, wherein said first closing means and said second closing means each compromise a sealed grommet.

11. Apparatus as described in claim 10, wherein said sealed grommet defines an axial bore extending through the grommet and forming a portion of said blood manifolding path.

* * * * *